United States Patent [19]

Shankarappa

[11] Patent Number: 5,715,308
[45] Date of Patent: Feb. 3, 1998

[54] APPARATUS FOR GENERATING ALERTS OF VARYING DEGREES

[75] Inventor: Vijay Shankarappa, San Jose, Calif.

[73] Assignee: Siemens Business Communication Systems, Inc., Iselin, N.J.

[21] Appl. No.: 395,396

[22] Filed: Feb. 22, 1995

[51] Int. Cl.$^6$ ............................................. H04M 1/00
[52] U.S. Cl. ................................. 379/373; 379/375
[58] Field of Search .......................... 379/373, 374, 379/375, 52, 372

[56] References Cited

U.S. PATENT DOCUMENTS

| | | |
|---|---|---|
| 3,343,100 | 9/1967 | Medina . |
| 3,702,904 | 11/1972 | Bard . |
| 4,777,474 | 10/1988 | Clayton ................................. 340/539 |
| 4,866,766 | 9/1989 | Mitzlaff ................................ 379/374 |
| 5,327,493 | 7/1994 | Richmond et al. .................... 379/372 |

FOREIGN PATENT DOCUMENTS

| | | |
|---|---|---|
| 62-269447 | 11/1987 | Japan . |
| 2210755 | 6/1989 | United Kingdom ................... 379/374 |

*Primary Examiner*—Ahmad F. Matar
*Attorney, Agent, or Firm*—Darryl A. Smith

[57] ABSTRACT

An alerting device generates a variable alert that is varied to continuously or continually indicate the amount of time that has elapsed since the alert began. The alerting device has an alert signal detector, a timing unit, an alert signal generator and an alert unit. The alert signal detector responds to an activation signal to activate the timing unit, and the alert signal detector responds to a deactivation signal to reset the timing unit. The timing unit generates timing information to the alert signal generator indicating the elapsed time since the occurrence of the activation signal. The alert signal generator responds to the activation signal and to the timing information to generate an alert signal that indicates the elapsed time since the occurrence of the activation signal. The alert signal generator further responds to the deactivation signal to disable the alert signal. The alert unit responds to the alert signal to generate an alert that reflects the elapsed time since the occurrence of the activation signal. The preferred embodiment of the alerting device involves a telephone ringing device that responds to a number of ring commands and generates a corresponding number of ringing sounds. The ringing device counts the number of rings of the telephone that are related to an incoming call, and the ringing device alters the cadence of the telephone ringing to differentiate between the different rings of the telephone. In the preferred embodiment, the ringing device generates a single beep after the first ring of the telephone, two beeps after the second ring of the telephone, and so on.

12 Claims, 3 Drawing Sheets

APPARATUS FOR GENERATING ALERTS OF VARYING DEGREES

TECHNICAL FIELD OF THE INVENTION

The present invention relates to devices that generate alerts to indicate the occurrence of events or conditions, such as telephone ringing devices and fire alarms, for example.

BACKGROUND OF THE INVENTION

The present invention relates to an alerting device. An alerting device generates a signal to indicate that an event or a condition has occurred. A smoke detector, for example, contains an alerting device that commonly generates a loud sound to alert people that smoke has been detected. Alerting devices can be configured to signal the occurrence of a wide variety of events or conditions, including equipment failures, inventory depletion, resource consumption, emergency situations, security breaches, communication attempts, timed events and others. Alerting devices can also signal such an occurrence in many different ways. For example, a smoke detector for a person that is hearing impaired may illuminate a bright, flashing light, instead of generating a sound.

Referring more specifically to a telephone application, an alerting device for indicating an incoming telephone call is herein referred to as a telephone ringing device. Typical telephone ringing devices previously consisted of mechanical bell devices that were activated by an electrical ring signal. More recent telephone ringing devices have various other methods for generating an audible sound, or otherwise indicating the event of an incoming call. For example, some telephone ringing devices contain a speaker for generating one or more audible tones. Some telephone ringing devices also generate different sounds to indicate whether a telephone call originated from within a company or from outside the company. Also, although many current telephone ringing devices no longer generate "ringing" sounds, as in the ringing of a bell, the "ring" terminology is still used.

SUMMARY OF THE INVENTION

Advantageously, the present invention generates an alert that is varied to indicate the amount of time that has elapsed since the current alert began. By observing the variation of the alert, the amount of time during which the alert has been active can be ascertained, and appropriate actions can be taken. As an example, suppose that a person enters a room and hears a telephone ringing. Suppose further that the phone has been programmed to forward calls to a different telephone after a certain number of rings. In one embodiment of the present invention, a telephone ringing device alters the audible sounds that it generates, so as to indicate how many times the telephone has rung during the current telephone call. By observing the sounds generated by the ringing device and determining how many times the phone has rung, the person can estimate the amount of time remaining before the telephone call will be forwarded. Based on this information, the person can determine whether he can answer the phone before it is forwarded and how much the person must rush to get to the phone before the call is forwarded.

A first embodiment of the present invention is an alerting device that generates an alert in response to an activation signal and a deactivation signal. The alert begins in response to the activation signal and ends in response to the deactivation signal. The alerting device alters a characteristic of the alert to indicate the amount of time that has elapsed since the activation signal. The alerting device comprises an alert signal detector, a timing unit, an alert signal generator, and an alert unit. The alert signal detector responds to the activation signal to activate the timing unit, and the alert signal detector responds to the deactivation signal to reset the timing unit. The timing unit generates timing information to the alert signal generator indicating the elapsed time since the activation signal. The alert signal generator responds to the activation signal and to the timing information to generate an alert signal that indicates the elapsed time since the activation signal. The alert signal generator further responds to the deactivation signal to stop generating the alert signal. The alert unit responds to the alert signal to generate an alert that indicates the elapsed time since the activation signal.

A second embodiment of the present invention is a ringing device in a telephone that generates one or more ring alerts in response to one or more ring commands to indicate an incoming telephone call. The ringing device comprises a ring detector for detecting each of the ring commands, a ring counter for counting the number of ring commands related to an incoming telephone call, a ring generator for generating one or more ring signals in response to the ring commands and a ringer. The ring counter is responsive to the ring detector, while the ring generator is responsive to the ring counter. The ring generator causes one or more of the ring signals to indicate the number offing commands related to an incoming telephone call. The ringer is responsive to the ring signals to generate the ring alerts, so that one or more of the ring alerts indicates the number of ring commands related to an incoming telephone call.

A third embodiment of the present invention involves a second ringing device in a telephone. The second ringing device receives at least a prior ring command and a subsequent ring command related to an incoming telephone call. The second ringing device generates a prior ring alert in response to the prior ring command and a subsequent ring alert in response to the subsequent ring command. The second ringing device comprises a ring detector, a ring counter, a ring generator and a ringer. The ring detector detects the prior ring command and generates a prior ring activation signal, and the ring detector detects the subsequent ring command and generates a subsequent ring activation signal. The ring counter counts the number of ring activation signals and provides information to the ring generator indicative of the number of ring activation signals. The ring generator generates a prior ring signal and a first beep signal in response to the prior ring activation signal and a subsequent ring signal and a second and third beep signals in response to the subsequent ring activation signal. The ringer generates a first sound in response to each of the ring signals and a second sound in response to each of the beep signals. The prior ring alert comprises the first sound and the second sound, while the subsequent ring alert comprises the first sound and two of the second sounds.

DETAILED DESCRIPTION

Figure 1:
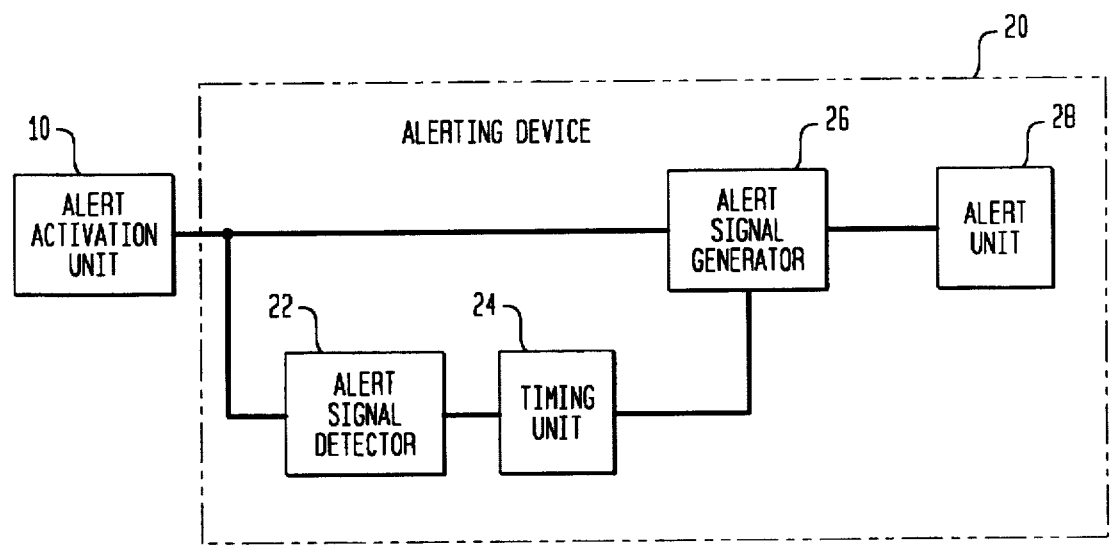
FIG. 1 illustrates a functional block diagram of an alert activation unit and an alerting device of the present invention.

FIG. 1 is a functional block diagram of an alerting device 20 of the present invention. The alerting device 20 comprises an alert signal detector 22, a timing unit 24, an alert signal generator 26 and an alert unit 28. FIG. 1 also illustrates an alert activation unit 10. The alert activation unit 10 is connected to the alert signal detector 22 and the alert signal generator 26. The alert signal detector 22 is connected to the timing unit 24. The timing unit 24 is connected to the alert signal generator 26. The alert signal generator 26 is connected to the alert unit 28.

The alert activation unit 10 generates a signal to the alerting device 20, or otherwise activates the alerting device 20 to generate an alert. For example, in the case of a smoke detector, the alert activation unit 10 may comprise a sensor that generates a signal upon the detection of smoke. The alerting device 20 responds to the activation by the alert activation unit 10 to begin generating an alert. The alert activation unit 10 also generates a deactivation signal to the alerting device 20, or otherwise deactivates the alerting device 20. Deactivating the alerting device 20 causes the alerting device 20 to stop generating the current alert.

The activation and deactivation of the alerting device 20 by the alert activation unit 10 may be accomplished in various ways. For example, an electronic signal on a single line may enter an active state to activate the alerting device 20, remain in the active state during the entire time that the alarm is to be active, and transition to an inactive state to deactivate the alerting device 20. In an alternative implementation, the alert activation unit 10 may transmit different commands, wherein each command comprises one or more bytes of digital data, to activate and deactivate the alerting device 20. A person of skill in the art will understand numerous other methods for activating and deactivating the alerting device 20.

The alert signal detector 22 detects the activation of the alerting device 20 by the alert activation unit 10 and activates the timing unit 24 to begin timing elapsed time. The alert signal detector 22 also detects the deactivation of the alerting device 20 by the alert activation unit 10 and resets the timing unit 24, so that the timing unit 24 is again ready to begin timing elapsed time upon subsequent activation by the alert signal detector 22. The timing unit 24 generates information to the alert signal generator 26 generally indicative of the amount of time that has elapsed since the alert activation unit 10 initiated the current alert. The timing unit 24 may comprise a digital counter, a charging capacitor, or various other devices that can be used to measure time. The alert signal detector 22 may comprise flip flops, multivibrators, or other components that can be used to detect the activation and deactivation signals from the alert activation unit 10 and control the timing unit 24.

The alert signal generator 26 responds to the activation signal from the alert activation unit 10 to begin generating an alert signal to the alert unit 28. The alert signal generator 26 continues to generate the alert signal to the alert unit 28 until the alert signal generator 26 receives the deactivation signal from the alert activation unit 10. The alert unit 28 responds to the alert signal from the alert signal generator 26 to actually generate the alert. The alert signal generated by the alert signal generator 26 and the structure of the alert unit 28 generally depend on the type of alert to be generated by the alert unit 28. In a smoke alarm, for example, the alert unit 28 may comprise a speaker, and the alert signal generator 26 may generate a sine wave for driving the speaker to produce an audible sound. As another example, the alert unit 28 may comprise a light bulb, and the alert signal generator 26 may generate a square wave to cause the light bulb to flash on and off.

In addition, the alert generated by the alert unit 28 has at least one characteristic that varies in response to a variation in a corresponding characteristic of the alert signal received from the alert signal generator 26. For example, the alert signal generator 26 may comprise a voltage controlled oscillator for generating a sine wave signal, and the alert unit 28 may comprise a speaker. In this case, the pitch of the sound generated by the alert unit 28 varies in response to variations in the frequency of the sine wave generated by the alert signal generator 26. A characteristic of the alert signal that affects a corresponding characteristic in the alert will be referred to as a "variable characteristic". In response to the timing information provided by the timing unit 24, the alert signal generator 26 modifies at least one variable characteristic of the alert signal so that the alert signal, and consequently the alert itself, produces an indication of the amount of time that has elapsed since the current alarm was initiated.

Referring again to the example in which the alert signal generator 26 comprises a voltage controlled oscillator, the alert signal generator 26 may gradually increase the frequency of the alert signal as the elapsed time increases. As a result, the pitch of the audible alarm generated by the alert unit 28 would gradually increase as the alert is sounding. A person hearing the alert can estimate the amount of time during which the alert has been sounding based on the pitch of the alert. The alert signal generator 26 may also modify more than one variable characteristic of the alert signal. For example, where the alert unit 28 again comprises a speaker, the alert signal generator 26 may gradually increase both the frequency and magnitude of the alert signal as the elapsed time increases, causing the pitch and volume of the audible alarm to gradually increase.

Figure 2:
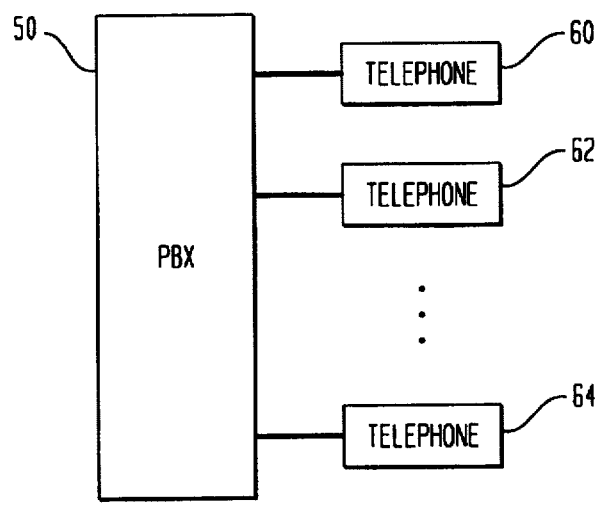
FIG. 2 illustrates a functional block diagram of a private branch exchange (PBX) telephone network.

A preferred embodiment of the alerting device of the present invention may be implemented in a PBX network, as illustrated in FIG. 2. The PBX network of FIG. 2 comprises a PBX system 50 and a plurality of digital telephones 60, 62 and 64. As is well know to a person of skill in the art, the PBX system 50 is typically connected to a central office of a telephone system by one or more trunk lines.

Figure 3:
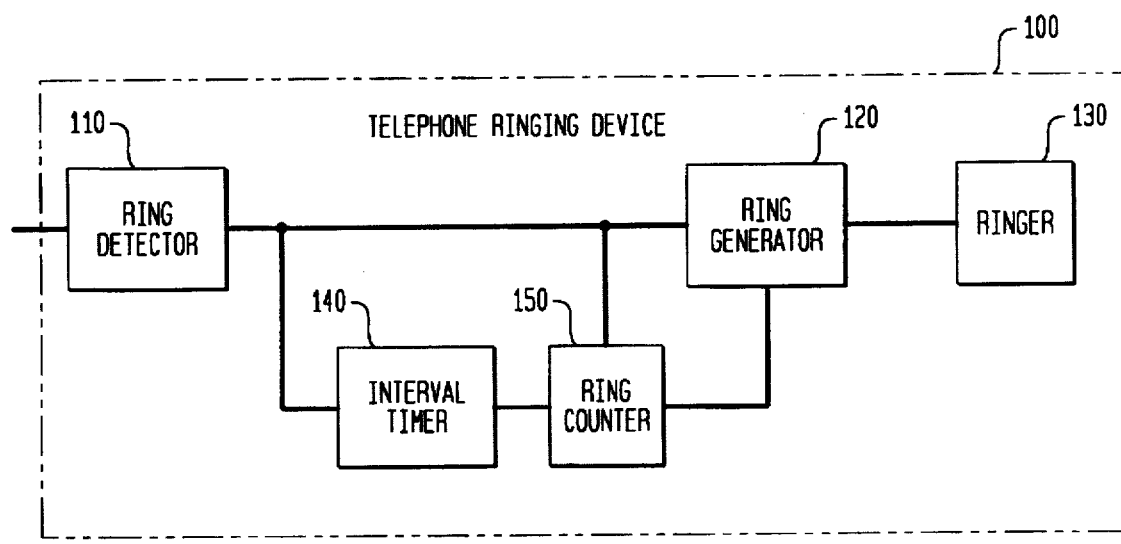
FIG. 3 illustrates a preferred embodiment of a telephone ringing device of the present invention.

FIG. 3 illustrates a preferred embodiment telephone ringing device 100 of the present invention. The telephone ringing device 100 may be used in one or more of the digital telephones 60, 62 and 64 illustrated in FIG. 2. The following discussion assumes that the telephone ringing device 100 is installed in the telephone 60. The telephone ringing device 100 comprises a ring detector 110, a ring generator 120, a ringer 130, an interval timer 140 and a ring counter 150. The ring detector 110 is connected to the ring generator 120, the interval timer 140 and the ring counter 150. The interval timer 140 is connected to the ring counter 150. The ring counter 150 is connected to the ring generator 120 is connected to the ringer 130. In the preferred embodiment of the present invention, the ring detector 110, the ring generator 120, the interval timer 140 and the ring counter 150 are all implemented in a single microprocessor. In this embodiment, the microprocessor preferably generates a square wave to drive the ringer 130. The ringer 130 preferably comprises an amplifier and a speaker.

The ring detector 110 receives commands from the PBX system 50 and determines when a received command is a ring command. Each command from the PBX system 50 typically comprises one or more bytes of digital data. To indicate an incoming call to the telephone 60, the PBX system 50 sends a ring-on command to the telephone 60, followed by a ring-off command. The telephone 60 produces a ringing sound after receiving a ring-on command and until receipt of a ring off-command. The PBX system 50 sends a separate set of ring-on/ring-off commands for each ring of the telephone 60. In other words, when an incoming call is directed to the telephone 60, the PBX system 50 sends a first ring-on command and a first ring-off command for the first ring of the telephone, a second ring-on command and a second ring-off command for the second ring of the telephone, and so on. The PBX system 50 also sends various other messages to the telephone 60 to control the operation of the telephone 60. As described above, the ring detector 110 is preferably implemented within a microprocessor that receives and decodes all messages that are addressed to the telephone 60 by the PBX system 50. When the ring detector 110 detects a ring-on command from the PBX system 50, the ring detector 110 activates a ring activation signal that is communicated to the ring generator 120, the interval timer 140 and the ring counter 150. When the ring detector 110 detects a ring-off command from the PBX system 50, the ring detector 110 deactivates the ring activation signal.

The interval timer 140 monitors the elapsed time between consecutive ring-on commands from the PBX system 50 by monitoring the ring activation signal from the ring detector 110. Specifically, the interval timer 140 determines that the ring detector 110 has detected a ring-on command when the ring activation signal is activated. Consecutive ring-on commands associated with a single telephone call are separated by a relatively short time gap, while a first ring-on command associated with a new telephone call is separated by a relatively long time gap from the last ring-on command of the previous telephone call. By monitoring the elapsed time between ring-on commands, the interval timer 140 determines when the ringing for a prior telephone call has ended and when the ringing for a subsequent telephone call has begun. A threshold time value is selected, based on the timing parameters of the PBX system, which is greater than the maximum possible delay between any two consecutive ring-on commands for a single telephone call. Typically, the threshold time value is also selected to be less than the minimum possible delay between the last ring-on command of a prior telephone call and the first ring-on command of a subsequent telephone call. Thus, when the delay between consecutive ring-on commands exceeds the threshold value, the subsequent ring-on command is considered to be related to a different telephone call from the prior ring-on command.

When the ring detector 110 detects the first ring-on command for a new telephone call, the interval timer 140 begins to monitor the elapsed time between subsequent ring-on commands. If a subsequent ring-on command is received before the threshold value expires, the interval timer 140 concludes that the ring-on command is associated with the same telephone call as the previous ring-on command. However, if the threshold value expires before the ring detector 110 has detected a subsequent ring-on command, the interval timer 140 concludes that the ringing for the current telephone call has ended. When the interval timer 140 determines that the ringing for a telephone call has ended, the interval timer 140 generates a reset signal to the ring counter 150 to cause the ring counter 150 to be reset to a value of zero.

In an alternative embodiment, the PBX system 50 sends an end-call command to the telephone 60 to indicate that a telephone call has ended. In this embodiment, the interval timer 140 is not necessary. The ring counter 150 is reset when the telephone 60 detects the end-call command from the PBX system 50. The interval timer 140 can be replaced in this alternative embodiment by an end-call detector that detects an end-call command from the PBX system 50. Upon detection of an end-call command from the PBX system 50, the end-call detector generates a reset signal to the ring counter 150.

In another alternative embodiment, the PBX system 50 sends an incoming-call command to the telephone 60 to indicate that an incoming telephone call is directed to the telephone 60. In this embodiment, the PBX system 50 does not generate separate ring-on and ring-off commands for each ring of the telephone 60 for an incoming telephone call. Instead, the PBX system 50 generates a single incoming-call command to the telephone 60, and the telephone 60 generates separate ring-on and ring-off commands to the telephone ringing device 100. In this case, the ring-on and ring-off commands preferably comprise different logic levels of a single electronic signal.

In the preferred embodiment, the ring counter 150 is a digital counter that is configured to count between the values of zero and four. As described above, when the interval timer 140 determines that the ringing for a telephone call has ended, the interval timer 140 causes the ring counter 150 to be reset to zero. The ring counter 150 is also reset to a value of zero when an incoming telephone call has been answered or when the telephone 60 is reset. When the PBX system 50 sends a ring-on command to the telephone 60, the ring counter 150 is incremented in response to the activation of the ring activation signal by the ring detector 110, that is, until the ring counter 150 reaches the value four. Thus, the ring counter 150 has an initial value of zero before the first ring-on command for a telephone call. After each of the first four ring-on commands for a telephone call, the ring counter 150 increments by one, so that the ring counter 150 has the values one, two, three and four after consecutive ring-on commands. After incrementing to the value of four after the fourth ring-on command, the ring counter 150 no longer increments for subsequent ring-on commands. As described above, the ring counter 150 resets when a call is answered or when the ringing for a call has ended.

The ring generator 120 controls the cadence of the ringing of the telephone 60. When the ring generator 120 detects the activation of the ring activation signal by the ring detector 110, the ring generator 120 begins generating a ring signal that drives the ringer 130 to produce a ringing sound. In the preferred embodiment, as described above, the ring signal generated by the ring generator 120 is a square wave having a frequency within the audible range, and the ringer 130 comprises an amplifier and a speaker. When the ring generator 120 detects the deactivation of the ring activation signal by the ring detector 110, the ring generator 120 stops generating the ring signal, and the ring ends.

Next, the ring generator 120 determines the value of the ring counter 150, and, after a short pause, the ring generator 120 controls the ringer 130 to produce a number of short beep sounds that corresponds to the value of the ring counter 150. Thus, after the first ring, the ring generator 120 controls the ringer 130 to produce one beep sound; after the second ring, the ring generator 120 controls the ringer 130 to produce two beep sounds; after the third ring, the ring generator 120 controls the ringer 130 to produce three beep sounds; and after the fourth and subsequent rings, the ring generator 120 controls the ringer 130 to produce four beep sounds. A person can listen to the beep sounds to determine the number of times that the telephone has rung, at least for the first four.

The ring generator 120 controls the ringer 130 to produce a beep sound by generating a beep signal that drives the ringer 130 to produce a short ringing sound or tone. In the preferred embodiment, the beep signal generated by the ring generator 120 is also a square wave having a frequency within the audible range. Also, in the preferred embodiment, the beep signal is generated on the same line as the ring signal. Also, in the preferred embodiment, the duration of the beep signal is approximately five percent of the duration of the ring signal, and the delay between the ring signal and the beep signal, as well as the delay between successive beep signals, is between zero and five percent of the duration of the ring signal. The beep signal may have the same frequency as the ring signal, or the frequencies can be different.

Figure 4A:
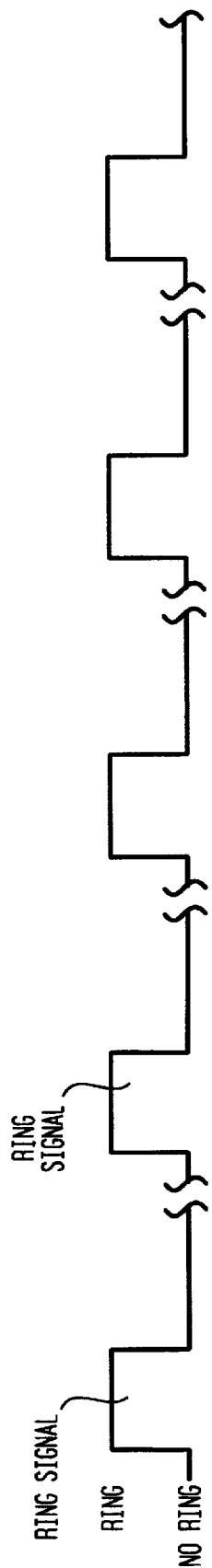
FIG. 4A illustrates a functional timing diagram for a ring signal that might be generated by a prior art telephone ringing device.

FIG. 4A illustrates a logical representation of a signal that might be produced by a prior art telephone ringing device. In the representation of FIG. 4A, a logic high value in the figure represents a signal that produces a ringing sound. Thus, prior art telephone ringing devices typically generate a simple series of ring signals, resulting in a simple series of ringing sounds. The actual ring signal may comprise a square wave having a frequency within the audible range, similar to the ring signal of the preferred embodiment.

Figure 4B:
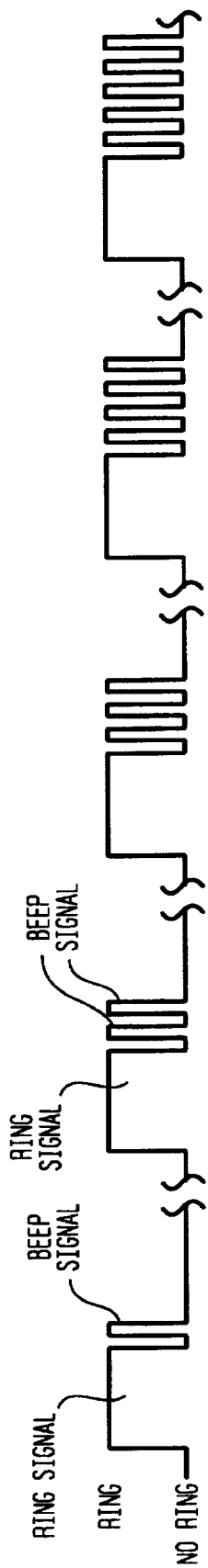
FIG. 4B illustrates a functional timing diagram for a combination of ring and beep signals generated by a preferred embodiment telephone ringing device of the present invention.

FIG. 4B illustrates a logical representation of the composite signal that is generated by the ring generator 120 of the present invention. Again, in the representation of FIG. 4B, a logic high value in the figure represents a signal that produces a ringing sound. The composite signal generated by the ring generator 120 comprises a number of ring signals having a relatively long duration, where each ring signal is followed by one or more beep signals having a relatively short duration. As described above, a single beep is produced after the first ring, two beeps are produced after the second ring, three beeps are produced after the third ring and four beeps are produced after each subsequent ring of the same telephone call.

The form of the ring signals and beep signals generated by the ring generator 120 can vary greatly from the forms described above relative to the preferred embodiment of the present invention, without departing from the intended scope of the present invention. In addition, the particular sounds generated by the ringer 130 in response to the ring signals and the beep signals can vary greatly. For example, in one embodiment of the present invention, the ring generator 120 may control the ringer 130 to enunciate a verbal number corresponding to the number of times that the telephone 60 has rung. In this case, the ringer 130 would generate a first ring, followed by the enunciated word "one"; a second ring, followed by the enunciated word "two"; and so on.

What is claimed is:

1. A ringing device in a telephone, said ringing device being responsive to one or more ring commands to generate one or more ring alerts to indicate an incoming telephone call, said ringing device comprising:
    a ring detector, said ring detector detecting each of said ring commands;
    a ring counter for counting the number of said ring commands related to an incoming telephone call, said ring counter being responsive to said ring detector;
    a ring generator for generating one or more ring signals in response to said ring commands, said ring generator being responsive to said ring counter to cause one or more of said ring signals to indicate the number of ring commands related to an incoming telephone call; and
    a ringer, said ringer being responsive to said ring signals to generate said ring alerts, one or more of said ring alerts indicating the number of ring commands related to an incoming telephone call.

2. The ringing device of claim 1, wherein each of said ring alerts comprises an audible sound.

3. The ringing device of claim 2, wherein each of said ring alerts comprises a ringing sound.

4. The ringing device of claim 1, wherein each of said ring commands comprises a digital command comprising one or more bytes of digital information.

5. The ringing device of claim 1, wherein each of said ring commands comprises an analog signal for driving a ringer in an analog telephone.

6. The ringing device of claim 1, wherein said ring detector generates a ring activation signal to said ring counter upon detection of each of said ring commands.

7. The ringing device of claim 1 additionally comprising an interval timer, said interval timer monitoring the elapsed time after receipt of a first ring command until receipt of a second ring command and determining when the ringing for an incoming telephone call has ended.

8. A ringing device in a telephone, said ringing device receiving at least a prior ring command and a subsequent ring command related to an incoming telephone call, said ringing device generating a prior ring alert in response to said prior ring command and a subsequent ring alert in response to said subsequent ring command, said ringing device comprising:
    a ring detector;
    a ring counter;
    a ring generator; and
    a ringer, wherein:
        said ring detector detects said prior ring command and generates a prior ring activation signal, and said ring detector detects said subsequent ring command and generates a subsequent ring activation signal;
        said ring counter counts the number of said ring activation signals and provides information to said ring generator indicative of the number of said ring activation signals;
        said ring generator generates a prior ring signal and a first beep signal in response to said prior ring activation signal and a subsequent ring signal and second and third beep signals in response to said subsequent ring activation signal; and
        said ringer generates a first sound in response to each of said ring signals and a second sound in response to each of said beep signals, said prior ring alert comprising said first sound and said second sound, said subsequent ring alert comprising said first sound and two of said second sounds.

9. The ringing device of claim 8, wherein said ring signals and said beep signals comprise logical square wave signals.

10. The ringing device of claim 8, wherein said ring detector, said ring counter and said ring generator are implemented within a single microprocessor.

11. The ringing device of claim 8, wherein said first sound and said second sound are substantially the same, except that said second sound has a shorter duration than said first sound.

12. The ringing device of claim 8 additionally comprising an interval timer, said interval timer monitoring the elapsed time after receipt of a first ring command until receipt of a second ring command and determining when the ringing for an incoming telephone call has ended.

* * * * *